(12) United States Patent
Cook (10) Patent No.: US 12,507,630 B2
(45) Date of Patent: Dec. 30, 2025

(54) REEL ADJUSTMENT FOR AN AGRICULTURAL HEADER

(71) Applicant: CNH Industrial America LLC, New Holland, PA (US)

(72) Inventor: Joel T. Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 623 days.

(21) Appl. No.: 17/920,543

(22) PCT Filed: Apr. 21, 2021

(86) PCT No.: PCT/US2021/028506
§ 371 (c)(1),
(2) Date: Oct. 21, 2022

(87) PCT Pub. No.: WO2021/216791
PCT Pub. Date: Oct. 28, 2021

(65) Prior Publication Data
US 2023/0143706 A1    May 11, 2023

Related U.S. Application Data

(60) Provisional application No. 63/013,036, filed on Apr. 21, 2020.

(51) Int. Cl.
*A01D 57/04* (2006.01)
*A01D 34/04* (2006.01)

(52) U.S. Cl.
CPC ............. *A01D 57/04* (2013.01); *A01D 34/04* (2013.01)

(58) Field of Classification Search
CPC ................................ A01D 57/04; A01D 34/04
See application file for complete search history.

(56) References Cited

U.S. PATENT DOCUMENTS

| 4,204,383 | A | | 5/1980 | Milliken, Jr. |
| 4,507,910 | A | | 4/1985 | Thornley et al. |
| 4,800,711 | A | | 1/1989 | Hurlburt et al. |
| 4,956,966 | A | | 9/1990 | Patterson |
| 5,243,810 | A | * | 9/1993 | Fox ..................... A01D 75/002 56/14.4 |

(Continued)

FOREIGN PATENT DOCUMENTS

| AU | 3649389 | A | * | 1/1990 |
| EP | 0208794 | A1 | | 1/1987 |

(Continued)

OTHER PUBLICATIONS

International Search Report and Written Opinion for PCT Application No. PCT/US2021/028506 dated Jul. 9, 2021 (13 pages).

*Primary Examiner* — Claude J Brown
(74) *Attorney, Agent, or Firm* — Buchanan Ingersoll & Rooney PC (57) ABSTRACT

A header (200) for an agricultural system (100) includes a frame (201), a bracket (228) movably coupled to the frame (201), a reel assembly (220) coupled to the bracket (228), and a cutter bar assembly (210) rotatably coupled to the frame (201) and coupled to the bracket (228) such that movement of the cutter bar assembly (210) relative to the frame (201) is configured to drive corresponding movement of the bracket (228) and the reel assembly (220) relative to the frame (201).

18 Claims, 5 Drawing Sheets

(56) References Cited

U.S. PATENT DOCUMENTS

| | | | | |
|---|---|---|---|---|
| 5,473,872 A * | 12/1995 | Fox | ............... | A01D 41/142 |
| | | | | 56/14.9 |
| 5,778,647 A * | 7/1998 | McLean | ............ | A01D 57/24 |
| | | | | 56/13.6 |
| 6,076,342 A * | 6/2000 | Loehr | ............ | A01D 43/107 |
| | | | | 56/208 |
| 6,442,918 B1 * | 9/2002 | Fox | ............ | A01D 57/03 |
| | | | | 56/220 |
| 7,730,707 B2 * | 6/2010 | Pietricola | ............ | A01D 57/04 |
| | | | | 56/221 |
| 2016/0183461 A1 * | 6/2016 | Neudorf | ............ | A01D 41/145 |
| | | | | 56/158 |
| 2019/0029177 A1 * | 1/2019 | Enns | ............ | A01D 41/14 |
| 2019/0082603 A1 | 3/2019 | Farley et al. | | |
| 2019/0230857 A1 * | 8/2019 | Thomson | ............ | A01D 41/141 |

FOREIGN PATENT DOCUMENTS

| | | | | |
|---|---|---|---|---|
| EP | 2055173 A1 | 5/2009 | | |
| EP | 3305058 A1 | 4/2018 | | |
| WO | WO-02102138 A1 * | 12/2002 | ............ | A01D 41/14 |
| WO | WO-2019046930 A1 * | 3/2019 | ............ | A01D 57/02 |

\* cited by examiner

REEL ADJUSTMENT FOR AN AGRICULTURAL HEADER

BACKGROUND

The disclosure relates generally to a header for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester. Certain headers include a cutter bar assembly configured to cut a portion of each crop (e.g., a stalk), thereby separating the cut crop from the soil. The cutter bar assembly may extend along a substantial portion of a width of the header at a forward end of the header. The header may also include one or more belts positioned behind the cutter bar assembly relative to the direction of travel of the harvester. The belt(s) are configured to transport the cut crops to an inlet of the processing system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In some embodiments, a header for an agricultural system includes a frame, a bracket movably coupled to the frame, a reel assembly coupled to the bracket, and a cutter bar assembly rotatably coupled to the frame and coupled to the bracket such that movement of the cutter bar assembly relative to the frame is configured to drive corresponding movement of the bracket and the reel assembly relative to the frame.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from a remainder of the crop. For example, a harvester may cut crops within a field via a header, which may include a flexible draper header. The flexible draper header may include a cutter bar assembly configured to cut the crops. As the cutter bar assembly cuts the crops, a conveyor coupled to draper deck(s) of the header moves the cut crops toward a crop processing system of the harvester. For example, the conveyor on the side draper deck(s) may move the cut crops toward an infeed draper deck at a center of the header. A conveyor on the infeed draper deck may then move the cut crops toward the crop processing system. The crop processing system may include a threshing machine configured to thresh the cut crops, thereby separating the cut crops into certain desired agricultural materials, such as grain, and material other than grain (MOG). The desired agricultural materials may be sifted and then accumulated into a tank. When the tank fills to capacity, the desired agricultural materials may be collected from the tank. The MOG may be discarded from the harvester (e.g., via a spreader) by passing through an exit pipe or a spreader to fall down onto the field.

In some embodiments, portions of the cutter bar assembly may move so as to follow a contour of the field. For example, the cutter bar assembly may be flexible to remain in contact with the field during operations. Furthermore, the header of the harvester includes a reel assembly configured to prepare crops to be cut by the cutter bar assembly and/or to direct the cut crops toward the conveyor(s). As an example, the reel assembly may be positioned adjacent to the cutter bar assembly and may be configured to guide the crops toward the cutter bar assembly to facilitate cutting the crops with the cutter bar assembly. In certain embodiments, the position of the reel assembly is adjustable relative to the cutter bar assembly so as to enable the reel assembly to effectively guide the crops toward the cutter bar assembly. However, in some circumstances, the cutter bar assembly and the reel assembly may interfere with one another. For instance, the cutter bar assembly may contact part of the reel assembly, thereby limiting an effectiveness of the cutter bar assembly, the reel assembly, and the header.

Thus, it is now recognized that enabling the reel assembly to move to avoid contact with the cutter bar assembly may provide various advantages. Accordingly, embodiments of the present disclosure are directed to a linkage system that mechanically links the reel assembly with the cutter bar assembly. The linkage system may enable movement of the cutter bar assembly to mechanically drive corresponding movement of the reel assembly. For example, the linkage system may maintain a distance between the reel assembly and the cutter bar assembly to avoid contact between the reel assembly and the cutter bar assembly. As a result, the linkage system may enable the reel assembly and the cutter bar assembly to operate more effectively, thereby improving operation of the harvester.

Figure 1:
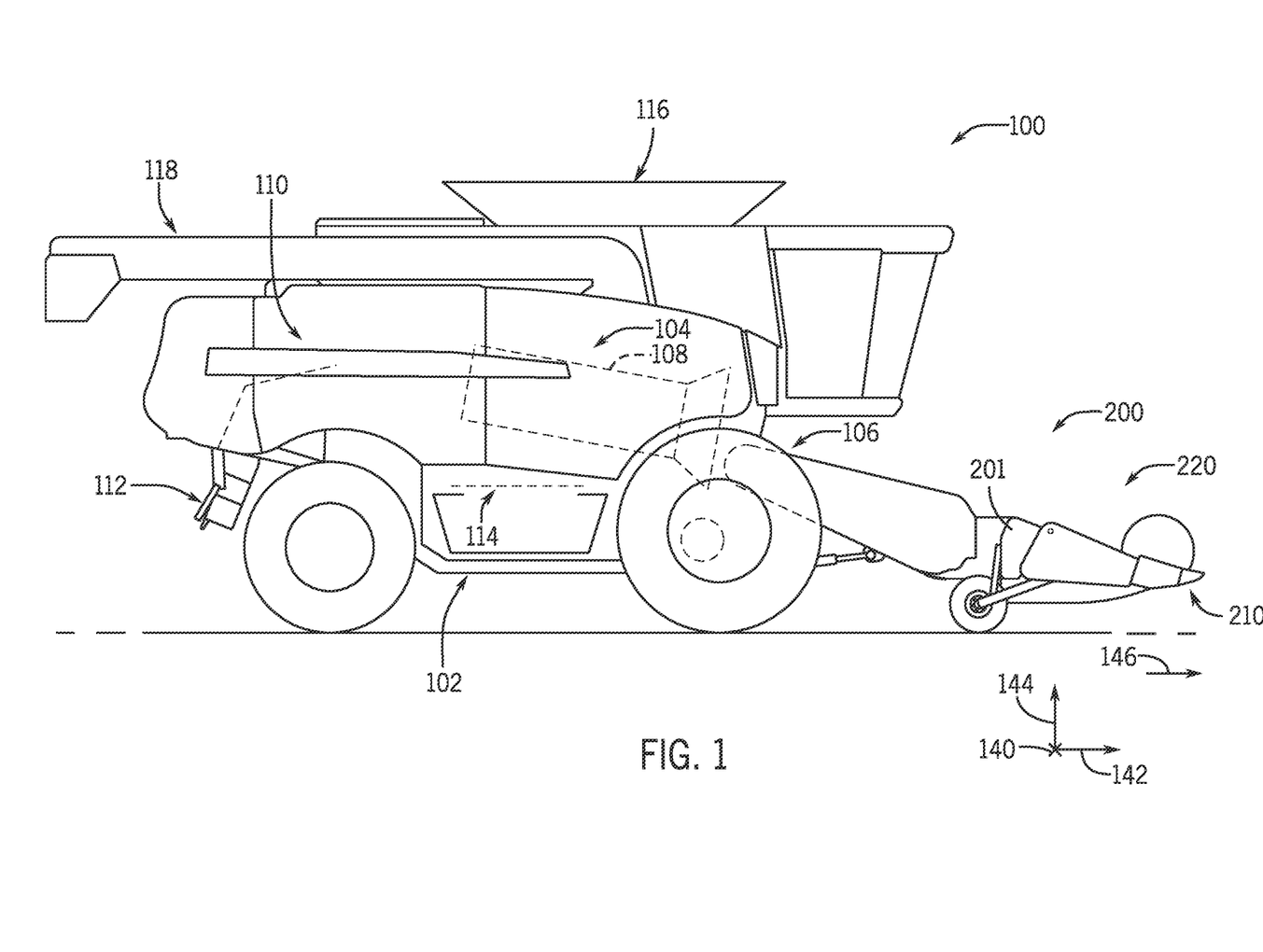
FIG. 1 is a side view of an embodiment of an agricultural system, in accordance with an aspect of the present disclosure.

With the foregoing in mind, FIG. 1 is a side view of an embodiment of an agricultural system 100, which may be a harvester (e.g., agricultural harvester). The agricultural system 100 includes a chassis 102 configured to support a header 200 (e.g., agricultural header) and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives the cut crops from the header 200 and separates desired crop material from crop residue. For example, the agricultural crop processing system 104 may include a thresher 108 having a cylindrical threshing rotor that transports the crops in a helical flow path through the agricultural system 100. In addition to transporting the crops, the thresher 108 may separate certain desired crop material (e.g., grain) from the crop residue, such as husks and pods, and may enable the desired crop material to flow into a cleaning system 114 (such as sieves) located beneath the thresher 108. The cleaning system 114 may remove debris from the desired crop material and transport the desired crop material to a storage tank 116 within the agricultural system 100. When the storage tank 116 is full, a tractor with a trailer on the back may pull alongside the agricultural system 100. The desired crop material collected in the storage tank 116 may be carried up by an elevator and dumped out of an unloader 118 into the trailer. The crop residue may be transported from the thresher 108 to a crop residue handling system 110, which may process (e.g., chop/shred) and remove the crop residue from the agricultural system 100 via a crop residue spreading system 112 positioned at an aft end of the agricultural system 100. To facilitate discussion, the agricultural system 100 and/or its components may be described with reference to a lateral axis or direction 140, a longitudinal axis or direction 142, and a vertical axis or direction 144. The agricultural system 100 and/or its components may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210 and/or to urge crops cut by the cutter bar assembly 210 onto a conveyor system that directs the cut crops toward the inlet 106 of the agricultural crop processing system 104. The reel assembly 220 includes a reel having multiple fingers extending from a central framework. The central framework is driven to rotate such that the fingers engage the crops and urge the crops toward the cutter bar assembly 210 and the conveyor system. Additionally, the reel may be supported by multiple arms (e.g., reel arms) that are coupled to a frame 201 of the header 200. Each of the arms may be coupled to the frame 201 via a respective pivot joint. For example, one pivot joint is configured to enable a first arm of the multiple arms to pivot (e.g., about the lateral axis 140) relative to the frame 201, and another pivot joint is configured to enable a second arm of the multiple arms to pivot (e.g., about the lateral axis 140) relative to the frame 201.

Figure 2:
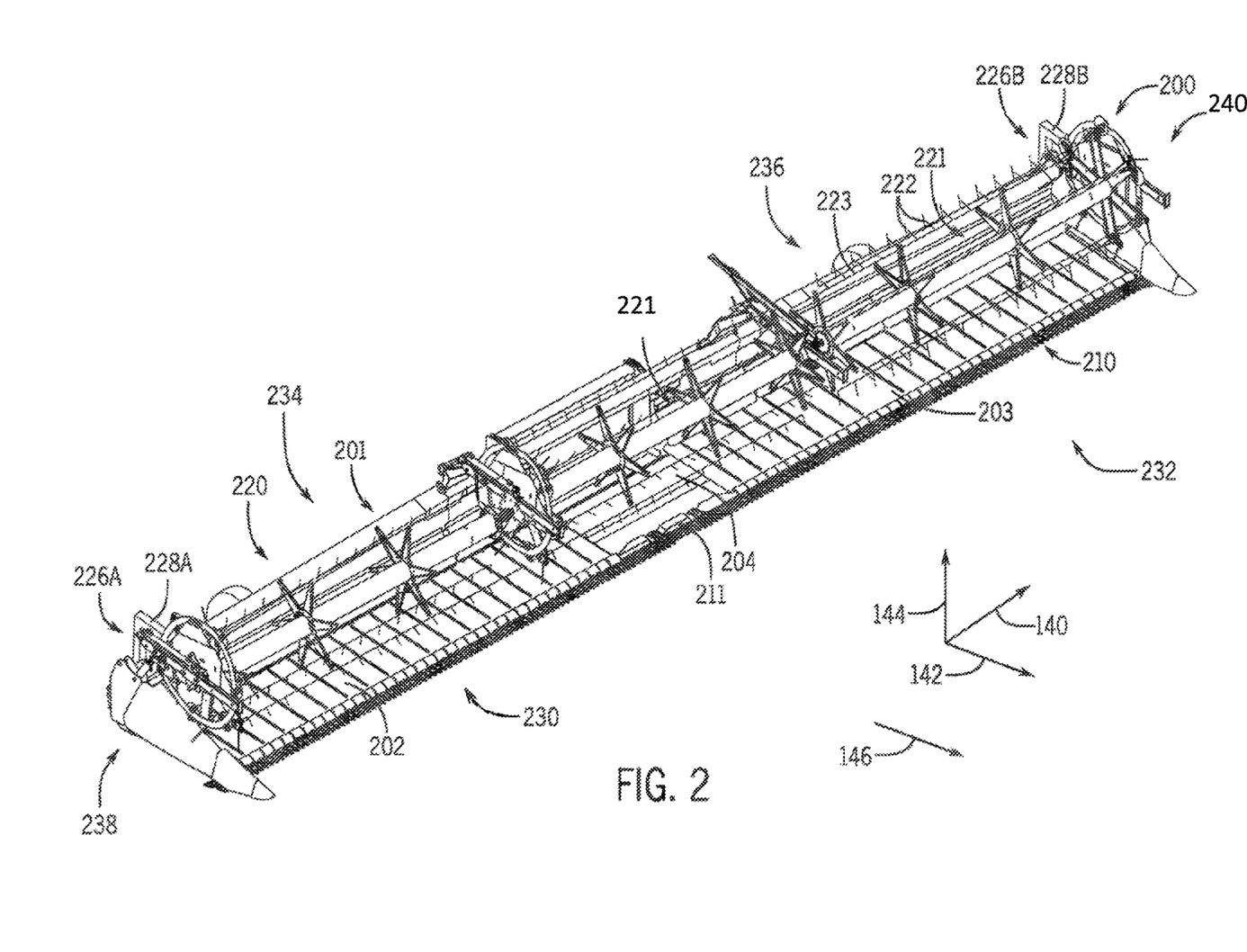
FIG. 2 is a perspective view of an embodiment of a header that may be employed within the agricultural system of FIG. 1, in accordance with an aspect of the present disclosure.

FIG. 2 is a perspective view of an embodiment of the header 200 that may be employed within the agricultural system 100 of FIG. 1. In the illustrated embodiment, the header 200 includes the cutter bar assembly 210 configured to cut a portion of each crop (e.g., a stalk), thereby separating the crop from the soil. The cutter bar assembly 210 is positioned at a forward end of the header 200 relative to the longitudinal axis 142 of the header 200. As illustrated, the cutter bar assembly 210 extends along a substantial portion of a width of the header 200 (e.g., along the lateral axis 140). The cutter bar assembly 210 may include a blade support, a stationary guard assembly, and a moving blade assembly. In such embodiments, the moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at a center portion of the header 200. However, in other embodiments, the blade support/moving blade assembly may be driven by another suitable mechanism (e.g., located at any suitable position on the header 200). As the agricultural system 100 is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first conveyor section 202 on a first lateral side of the header 200 and a second conveyor section 203 on a second lateral side of the header 200 opposite the first lateral side. The conveyor sections 202, 203 may be separate from one another. For instance, the first conveyor section 202 may extend along a portion of the width of the header 200 and the second conveyor section 203 may extend along another portion of the width of the header 200. Each conveyor section 202, 203 is driven to rotate by a suitable drive mechanism, such as an electric motor or a hydraulic motor. The first conveyor section 202 and the second conveyor section 203 are driven such that a top surface of each conveyor section 202, 203 moves laterally inward to a center conveyor section 204 positioned between the first conveyor section 202 and the second conveyor section 203 along the lateral axis 140. The center conveyor section 204 may also be driven to rotate by a suitable drive mechanism, such as an electric motor or a hydraulic motor. The center conveyor section 204 is driven such that the top surface of the center conveyor section 204 moves rearwardly relative to the direction of travel 146 toward the inlet. As a result, the conveyor sections 202, 203, 204 transport the cut crops through the inlet to the agricultural crop processing system for further processing of the cut crops. Although the illustrated header 200 includes two conveyor sections 202, 203 configured to direct the cut crops toward the center conveyor section 204, there may be any suitable number of conveyor sections in additional or alternative embodiments directing the cut crops toward the center conveyor section.

In the illustrated embodiment, the crops cut by the cutter bar assembly 210 are directed toward the conveyor sections 202, 203 at least in part by the reel assembly 220, thereby substantially reducing the possibility of the cut crops falling onto the surface of the field. The reel assembly 220 includes a reel 221 having multiple fingers or tines 222 extending from a central framework 223. The central framework 223 is driven to rotate such that the fingers 222 move (e.g., in a circular pattern). The fingers 222 are configured to engage the crops and urge the cut crops toward the conveyor sections 202, 203 to facilitate transportation of the cut crops to the agricultural crop processing system.

As illustrated herein, the cutter bar assembly 210 is flexible along the width of the first and second conveyor sections 202 and 203. In an exemplary alternative embodiment, the cutter bar assembly 210 is flexible along an entire width of the cutter bar assembly 210.

As discussed in detail below, the cutter bar assembly 210 is supported by multiple arm assemblies distributed (e.g., spaced apart) along the width of the header 200. In some embodiments, the frame 201 of the header 200 may be movably coupled to the chassis of the agricultural system. Each arm assembly of the cutter bar assembly 210 is mounted to the frame 201 and includes an arm coupled to various components (e.g., the blade support, the stationary guard assembly, and the moving blade assembly) of the cutter bar assembly 210. The arm may rotate and/or move the cutter bar assembly 210 along the vertical axis 144 relative to the frame 201, thereby enabling the cutter bar assembly 210 to flex during operation of the agricultural system. Thus, the cutter bar assembly 210 may follow the contours of the field, thereby enabling the cutting height (e.g., the height at which each crop is cut) to be substantially constant along the width of the header 200.

Furthermore, the reel assembly 220 is coupled to the cutter bar assembly 210 via a linkage system 226, which is coupled to the frame 201 of the header 200. For example, the linkage system 226 may include one or more brackets 228 to which the reel assembly 220 is coupled and to which the arm assemblies of the cutter bar assembly 210 are coupled. Movement of the arm assemblies (e.g., rotational movement) may move the one or more brackets 228, thereby driving corresponding movement of the reel assembly 220. As an example, movement of at least a portion of the moving blade assembly of the cutter bar assembly 210 in an upward direction along the vertical axis 144 causes movement of the arm assembly and drives rotation of at least one of the one or more brackets 228 relative to the frame 201, thereby raising the reel assembly 220 along the vertical axis 144 relative to the frame 201. Accordingly, movement of the moving blade assembly of the cutter bar assembly 210 in the upward direction drives (e.g., automatically drives via the one or more brackets 228) movement of the reel assembly 220 in the upward direction. In this way, the one or more brackets 228 may maintain a distance between the cutter bar assembly 210 (e.g., the moving blade assembly of the cutter bar assembly 210) and the reel assembly 220 (e.g., the reel of the reel assembly 220) to block the cutter bar assembly 210 from contacting the reel assembly 220 as the agricultural system travels through the field.

In some embodiments, the reel assembly 220 may include reel sections that correspond with cutter bar sections of the cutter bar assembly 210. For instance, the cutter bar assembly 210 may include a first cutter bar section 230 (e.g., at a first lateral portion of the header 200 and/or generally aligned with the first conveyor section 202) and a second cutter bar section 232 (e.g., at a second lateral portion of the header 200 and/or generally aligned with the second conveyor section 203). The reel assembly 220 may include a first reel section 234 (e.g., at the first lateral portion of the header 200 and/or generally aligned with the first conveyor section 202) corresponding to and/or generally aligned with the first cutter bar section 230 and a second reel section 236 (e.g., at the second lateral portion of the header 200 and/or generally aligned with the second conveyor section 203) corresponding to and/or generally aligned with the second cutter bar section 232.

Movement of the cutter bar sections 230, 232 may drive respective movement of the reel sections 234, 236. That is, the first cutter bar section 230 may drive movement of the first reel section 234 via respective bracket(s) 28-228 positioned between and coupling the first cutter bar section 230 and the first reel section 234, but the first cutter bar section 230 may not drive movement of the second reel section 236. Similarly, the second cutter bar section 232 may drive movement of the second reel section 236 via respective bracket(s) positioned between and coupling the second cutter bar section 232 and the second reel section 236, but the second cutter bar section 232 may not drive movement of the first reel section 234. To this end, a first linkage system 226A may include a first bracket 228A (e.g., positioned at a first lateral edge portion 238 of the header 200) that couples the first cutter bar section 230 and the first reel section 234 to one another, and a second linkage system 226B may include a second bracket 228B (e.g., positioned at a second lateral edge portion 240 of the header 200) that couples the second cutter bar section 232 and the second reel section 236 to one another. By way of example, the first linkage system 226A may extend laterally from the first lateral edge portion 238 to or toward the center conveyor section 204, and the second linkage system 226B may extend from the second lateral edge portion 240 to or toward the center conveyor section 204. Movement of the arm assemblies of the first cutter bar section 230 may drive movement of the first bracket 228A to move the first reel section 234, and movement of the arm assemblies of the second cutter bar section 232 may drive movement of the second bracket 228B to move the second reel section 236. In this manner, movement of each reel section 234, 236 may correspond to and may occur automatically in response to movement of the respective cutter bar sections 230, 232. As a result, different parts of the reel assembly 220 (e.g., across the width of the header 200) may move independently of one another, which may enable the reel assembly 220 to follow movement of the cutter bar assembly 210 more closely to improve the effectiveness of the header 200.

Figure 3:
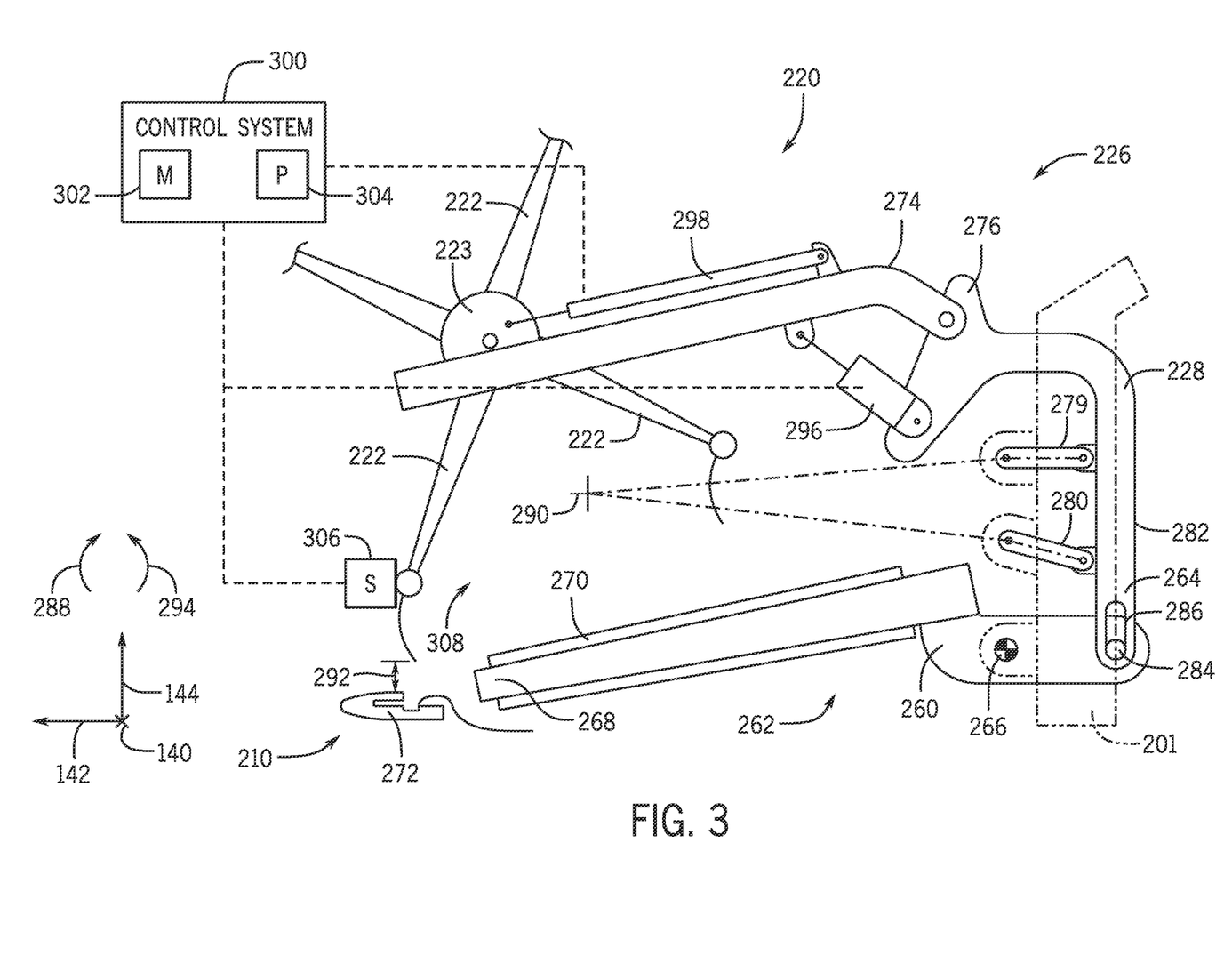
FIG. 3 is a side view of an embodiment of a linkage system that may be employed in the header of FIG. 2, in accordance with an aspect of the present disclosure.

FIG. 3 is a side view of an embodiment of the linkage system 226 that may be employed in the header 200 of FIG. 2. The linkage system 226 includes the bracket 228, which includes an L-shape in the illustrated embodiment. However, additional or alternative brackets may include any suitable geometry. An arm 260 of an arm assembly 262 of the cutter bar assembly 210 is coupled to a first section 264 of the bracket 228. The arm 260 may also be coupled (e.g., pivotably coupled) to the frame 201 via a pivot 266 (e.g., a pin that extends along the lateral axis 140). The arm 260 may include a surface 268 (e.g., upper surface) that supports a conveyor 270 (e.g., a belt). The arm 260 may support a blade 272 (e.g., of the moving blade assembly). A reel arm 274 of the reel assembly 220 is coupled to a second section 276 of the bracket 228. The reel arm 274 supports a central framework 223 having multiple fingers or tines 222. During operation of the header, the central framework 223 may rotate to cause the fingers 222 to engage the crops and urge the crops toward the blade 272 and the conveyor 270. As such, the reel assembly 220 facilitates cutting and transportation of the crops for processing.

The bracket 228 may indirectly couple the reel assembly 220 and the arm assembly 262 with one another such that movement of the arm assembly 262 causes corresponding movement of the reel assembly 220. For example, during operation of the header, the arm 260 may be positioned such that the blade 272 is at a distance relative to the ground. As the header follows the ground, the contour of the ground may cause the blade 272 to move along the vertical axis 144, thereby causing the arm 260 to rotate about the pivot 266. Rotation of the arm 260 may then cause movement of the bracket 228. For example, the bracket 228 may be rotatably coupled to the frame 201 (shown in phantom lines) via a first link 279 and a second link 280, which may each be coupled to a third section 282 of the bracket 228 between the first section 264 and the second section 276. Each link 279, 280 is rotatably coupled at one end portion to the bracket 228 (e.g., via an interface, such as a key-slot interface) and at another end portion to the frame 201 of the header.

The arm 260 may include an insert 284 (e.g., a pin) configured to extend into or through an opening 286 (e.g., a slot a groove) of the first section 264 of the bracket 228. It should be noted that the interface that couples the arm 260 to the bracket 228 may have other configurations. For example, in some embodiments, the insert may be provided on the bracket and the opening may be provided on the arm. Raising the blade 272 along the vertical axis 144 (e.g., in response to a bump on the ground or elevated portion of the ground as the agricultural system travels through the field) may cause the arm 260 to rotate in a first rotational direction 288 about the pivot 266, thereby lowering the insert 284 along the vertical axis 144. Lowering of the insert 284 along the vertical axis 144 may cause the insert 284 to exert a force on the bracket 228 (e.g., via contact between the insert 284 and the opening 286) that may cause the bracket 228 to rotate about the frame 201 in the first rotational direction 288 about a pivot point 290 (e.g., a virtual pivot point) via the first link 279 and the second link 280. In additional or alternative embodiments, the insert may constantly maintain contact with a part of the bracket (e.g., a bottom portion bordering the opening due to a gravitational force), until the contour of the ground causes the arm to pivot and therefore move the insert and drive rotation of the bracket.

Moreover, the reel arm 274 may be substantially fixedly (e.g., non-rotatably) coupled to the bracket 228 such that rotation of the bracket 228 in the first rotational direction 288 causes the reel arm 274 to rotate in the first rotational direction 288, thereby raising the central framework 223 and the fingers 222. As a result, the bracket 228 may maintain a distance 292 between the fingers 222 and the blade 272 (e.g., within a distance range) to block contact between the fingers 222 and the blade 272. As used herein, the distance 292 may refer to a minimum distance between the fingers 222 and the blade 272 at a particular position of the arm assembly 262 relative to the bracket 228 and during operation of the header. That is, during operation of the header, the central framework 223 may rotate and cause the fingers 222 to be in constant rotational movement relative to the blade 272, thereby constantly changing the distance between each finger 222 extending off the central framework 223. The distance 292 is the minimum possible distance between one of the fingers 222 and the blade 272 as the central framework 223 rotates.

Similarly, lowering the blade 272 along the vertical axis 144 (e.g., in response to a dip in the ground or lower portion of the ground as the agricultural system travels through the field) may cause the arm 260 to rotate in a second rotational direction 294, opposite the first rotational direction 288, about the pivot 266, thereby raising the insert 284 along the vertical axis 144. Raising the insert 284 along the vertical axis 144 may cause the insert 284 to exert a force on the bracket 228 (e.g., via contact between the insert 284 and the opening 286) that may cause the bracket 228 to rotate relative to the frame 201 in the second rotational direction 294 about the pivot point 290, thereby driving the reel arm 274 to rotate in the second rotational direction 294 and lowering the central framework 223 and the fingers 222. Therefore, the bracket 228 may also maintain the distance 292 (e.g., within the distance range) so as to position the fingers 222 relative to the arm assembly 262 in order to facilitate operation of the header.

In this manner, the bracket 228 may improve the positioning of the reel assembly 220 relative to the arm assembly 262 by maintaining the fingers 222 at a suitable distance away from the blade 272 without having to use electronic control and/or sensing features. That is, the bracket 228 enables the movement of the arm assembly 262 to mechanically drive movement of the reel assembly 220, thereby enabling the reel assembly 220 to move automatically based on and in response to movement of the arm assembly 262. As a result, the bracket 228 may improve the operation of the header and block contact between the fingers 222 and the blade 272 without having to use a sensor to determine the position of the reel assembly 220 and/or of the arm assembly 262 and/or without an electronic controller that adjusts the position of the reel assembly 220 and/or of the arm assembly 262 based on data received from the sensor. For this reason, a cost associated with the manufacture and/or operation of the header may be reduced, and/or an operation of the header may be improved.

In some embodiments, the bracket 228 may extend along the lateral axis 140, and multiple arm assemblies 262 of the cutter blade assembly may be coupled to the bracket 228 and configured to cause rotational movement of the bracket 228. In other words, each arm assembly 262 may move independently of one another, and movement of any one of the arm assemblies 262 may cause movement of the bracket 228 and therefore of the reel assembly 220. In certain embodiments, the opening 286 may have a geometry to enable a limited amount of relative movement between the bracket 228 and each arm assembly 262. Such a configuration may enable each of the arm assemblies 262 to move slightly without causing the bracket 228 to move and/or may enable the bracket 228 to move due to the movement of one of the arm assemblies 262 without affecting movement of at least some of the remaining arm assemblies 262. In some embodiments, the opening 286 may have an oblong shape (e.g., along the vertical axis 144) to provide clearance for the arm assemblies 262 to rotate about the pivot 266 to a limited degree without moving the bracket 228. For example, with reference to FIG. 3, the illustrated arm assembly 262 may rotate in the second rotational direction 294 to a limited degree without substantially driving movement of the bracket 228 because the insert 284 may slide or move along the vertical axis 144 within the opening 286. Thus, each arm assembly 262 across the width of the bracket 228 may move independently and in some limited way without driving the movement of the bracket 228 and the reel assembly 220, and each arm assembly 262 may only drive the movement of the bracket 228 and the reel assembly 220 upon substantial changes in the contour of the ground as the agricultural system travels through the field (e.g., that cause the insert 284 to move and exert a force at one of the vertical ends of the opening 286). Such geometry may, for example, maintain the distance 292 between the fingers 222 of the reel assembly 220 and the blade 272 above a first threshold distance and below a second threshold distance.

By way of example, an additional arm assembly may mechanically cause the bracket 228 to be maintained at the illustrated position such that the distance between the additional arm assembly and a corresponding blade is maintained. However, at the illustrated position of the bracket 228, the arm assembly 262 may rotate in the second rotational direction 294 without the insert 284 driving the bracket 228 to rotate and therefore move the additional arm assembly, for example. As a result, the distance 292 between the fingers 222 of the reel assembly 220 and the blade 272 may change (e.g., increase), but the distance between the fingers 222 of the reel assembly 220 and the blade of the additional arm assembly may be maintained. Similarly, the geometry of the opening 286 may block movement of the insert 284 (e.g., driven by the first section 264 of the bracket 228) such that the position of the arm assembly 262 is substantially maintained during certain movement of the bracket 228. For instance, if the arm assembly 262 remains in the illustrated position, the bracket 228 may rotate in the first rotational direction 288 (e.g., as caused by the additional arm assembly) without driving corresponding movement of the arm assembly 262. In this way, the position of the arm assembly 262 may be driven by the contour of the ground rather than by the bracket 228 and/or by other arm assemblies.

In certain embodiments, the distance 292 (e.g., the first threshold distance) may be set by a user, such as an operator of the header. For example, the reel arm 274 may be selectively rotatably coupled to the second section 276 of the bracket 228, and the reel assembly 220 may include a first actuator 296 coupled to the reel arm 274 and to the second section 276 of the bracket 228. The first actuator 296 may support and/or adjust the position of the reel arm 274 relative to the bracket 228. For example, the first actuator 296 may extend to rotate the reel arm 274 in the first rotational direction 288 relative to the bracket 228, thereby increasing the distance 292 between the fingers 222 and the blade 272, and the first actuator 296 may retract to rotate the reel arm 274 in the second rotational direction 294 relative to the bracket 228, thereby reducing the distance 292 between the fingers 222 and the blade 272. Once a desirable position of the reel arm 274 relative to the bracket 228 is achieved, the first actuator 296 may be locked to thereby block rotation of the reel arm 274 relative to the bracket 228.

The reel assembly 220 may also include a second actuator 298 configured to support and/or move (e.g., translate) the central framework 223 relative to the reel arm 274. By way of example, the second actuator 298 may extend to move the central framework 223 away from the bracket 228, and the second actuator 298 may retract to move the central framework 223 toward the bracket 228. Such movement of the central framework 223 may change the distance 292 between the fingers 222 and the blade 272. In the illustrated embodiment, the reel arm 274 is downwardly sloped relative to the bracket 228 and to the blade 272, and extension of the second actuator 298 may therefore reduce the distance 292 between the fingers 222 and the blade 272. However, if the reel arm is upwardly sloped relative to the bracket and to the blade, extension of the second actuator may increase the distance between the fingers and the blade.

The first actuator 296 and/or the second actuator 298 may be communicatively coupled to a control system 300 (e.g., an electronic controller, a hydraulic controller) of the agricultural system. The control system 300 may have a memory 302 and a processor 304, such as a microprocessor. The memory 302 may include volatile memory, such as random access memory (RAM), and/or non-volatile memory, such as read-only memory (ROM), optical drives, hard disc drives, solid-state drives, or any other non-transitory computer-readable medium that includes instructions to facilitate operation of the header. The processor 304 may include one or more application specific integrated circuits (ASICs), one or more field programmable gate arrays (FPGAs), one or more general purpose processors, or any combination thereof, configured to execute the instructions stored in the memory 302 to control the header. For instance, the control system 300 may be configured to receive a user input to adjust the reel assembly 220, such as to activate the first actuator 296 and/or the second actuator 298. Based on the user input, the control system 300 may cause (e.g., via a control signal, via hydraulic fluid flow) the first actuator 296 to move the reel arm 274 relative to the bracket 228 and/or may cause the second actuator 298 to set the position of the central framework 223 relative to the reel arm 274. In this way, the control system 300 may adjust the distance 292 between the fingers 222 and the blade 272 based on the user input. In additional or alternative embodiments, the control system may automatically adjust the reel assembly, such as based on data received from a sensor 306. The sensor may monitor an operating parameter of the header, such as the distance 292, a time of operation of the header, an angle of the reel arm 274 relative to the bracket 228, an angle of the arm 260 relative to the bracket 228, a position of the first actuator 296, a position of the second actuator 298, another suitable parameter, or any combination thereof. The sensor 306 may transmit data indicative of the operating parameter to the control system 300, and the control system 300 may transmit the control signal to the first actuator 296 and/or to the second actuator 298 based on the data.

Although the illustrated linkage system 226 includes two links 279, 280, it should be noted that additional or alternative linkage systems may include any suitable number of links, such as one link, three links, or four or more links rotatably coupling the bracket to the frame. Moreover, the links 279, 280 may be arranged to set the pivot point 290 of the bracket 228 at any suitable location. For example, the illustrated pivot point 290 is located within a space 308 formed by the reel assembly 220, the arm assembly 262, and the bracket 228 to facilitate movement of the bracket 228 as driven by the arm 260. In particular, the space 308 is forward of the bracket 228 relative to the longitudinal axis 142 and between the arm assembly 262 and the reel assembly 220 relative to the vertical axis 144. The links 279, 280 extend from the bracket 228 and converge toward one another so that the pivot point 290 is located within the space 308. Additional or alternative pivot points may be located at other locations, such as between the illustrated pivot point and the bracket along the longitudinal axis, rightward of the bracket along the longitudinal axis 142. To this end, the links may have a particular geometry, may be at particular angles relative to the frame and/or relative to one another, and/or may be connected to the frame at particular locations to position the pivot point accordingly. A further arrangement of the links may eliminate the pivot point such that the bracket 228 does not substantially rotate relative to the frame. Rather, the bracket may translate relative to the frame, such as along the vertical axis 144, so as to move the reel assembly relative to the arm assembly.

Figure 4:
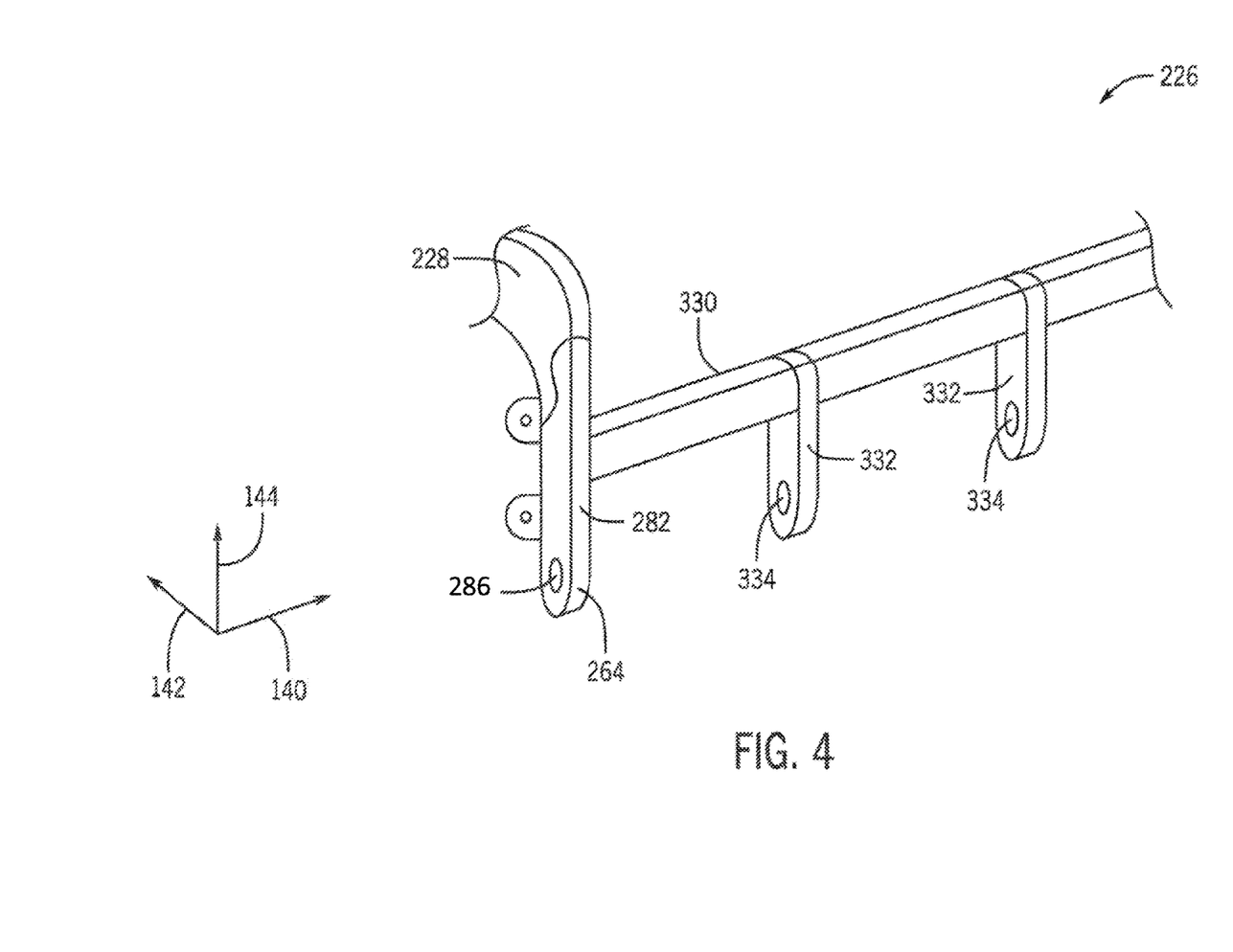
FIG. 4 is a perspective rear view of an embodiment of the linkage system of FIG. 3, in accordance with an aspect of the present disclosure.

FIG. 4 is a perspective rear view of an embodiment of the linkage system 226 of FIG. 3. The illustrated linkage system 226 includes the bracket 228, which may be configured to couple to the reel assembly and the arm assembly as described above. In addition, the bracket 228 includes an extension 330 extending along the lateral axis 140 (e.g., along the frame of the header). The linkage system 226 further includes supplementary brackets 332 extending from the extension 330. Each supplementary bracket 332 may align with one another and with the bracket 228 (e.g., with the first section 264 and the third section 282 of the bracket 228) along the longitudinal axis 142, and each supplementary bracket 332 may be offset from one another and from the bracket 228 along the lateral axis 140. Further, each supplementary bracket 332 may be configured to couple to a respective arm assembly of the cutter bar assembly (e.g., via an interface, such as a key-slot interface). For example, each supplementary bracket 332 may include a respective opening 334 generally aligned with one another and with the opening 286 of the bracket 228 along the longitudinal axis 142. As such, each arm assembly coupled to the linkage system 226 may also generally align with one another along the longitudinal axis 142 and may be offset from one another along the lateral axis 140. By way of example, the distance between each arm assembly along the lateral axis 140 may be 5 centimeters (2 inches), 15 centimeters (6 inches), 30 centimeters (1 foot), 76 centimeters (2.5 feet), 91 centimeters (3 feet), 150 centimeters (5 feet), or any suitable distance. In certain embodiments, the illustrated linkage system 226 may be implemented to move arm assemblies of one of the cutter bar sections (e.g., the first cutter bar section 230), and a separate linkage system may be implemented to move arm assemblies of another one of the cutter bar sections (e.g., the second cutter bar section 232).

In the illustrated linkage system 226, each opening 334 also includes an oblong geometry, similar to the geometry of the opening 286 of the bracket 228. As mentioned above, the oblong geometry of each opening 334 enables some movement of each arm assembly relative to one another (e.g., to follow the contour of the ground) without substantially driving the bracket 228 to move and/or enables some movement of the bracket 228 without substantially driving at least some of the arm assemblies to move. Moreover, the bracket 228, the extension 330, and the supplementary brackets 332 may be fixedly or rigidly coupled to one another. As such, substantially raising of any of the arm assemblies may drive each of the supplementary bracket 228 and the brackets 332 to raise the reel assembly. For example, the position of the bracket 228 may be driven by the arm having the highest blade (e.g., rotated the most about the pivot in the first rotational direction) in order to maintain the distance between the reel assembly and the blade of any of the arm assemblies above a threshold distance (e.g., the first threshold distance). Indeed, the distance (e.g., along the vertical axis) between the reel assembly and the blade of any of the arm assemblies coupled to the linkage system 226 may be maintained between a suitable distance range, such as between 2.5 centimeters (1 inch) and 10 centimeters (4 inches), between 5 centimeters (2 inches) and 18 centimeters (7 inches), between another suitable distance range, or any combination thereof. The distance range may include the first threshold distance and the second threshold distance, which, for instance, may each be based on the position of the reel arm relative to the bracket (e.g., set by the first actuator) and/or based on the position of the central framework relative to the reel arm (e.g., set by the second actuator). In this way, the distance range may be set by the control system, such as based on a user input and/or sensor data.

In some embodiments, the arm of each arm assembly may straddle the respective brackets 228, 332. That is, for example, each arm assembly may include a U-shaped connector portion or flanges that receive and/or overlap with either side of one of the brackets 228, 332. Either or both of the flanges may include a respective insert configured to insert into the corresponding openings 286, 332. As such, the flanges may substantially block movement of the arm assemblies relative to the brackets 228, 332 along the lateral axis 140 to provide a more secure interface between the arm assemblies and the brackets 228, 332. As noted above, the interface between the arm and the bracket 228 may have various configurations. For example, the brackets may have a U-shaped connector portion or flanges that receive and/or overlap with the arm and/or the brackets may include the inserts, while the arm may include the openings.

Figure 5:
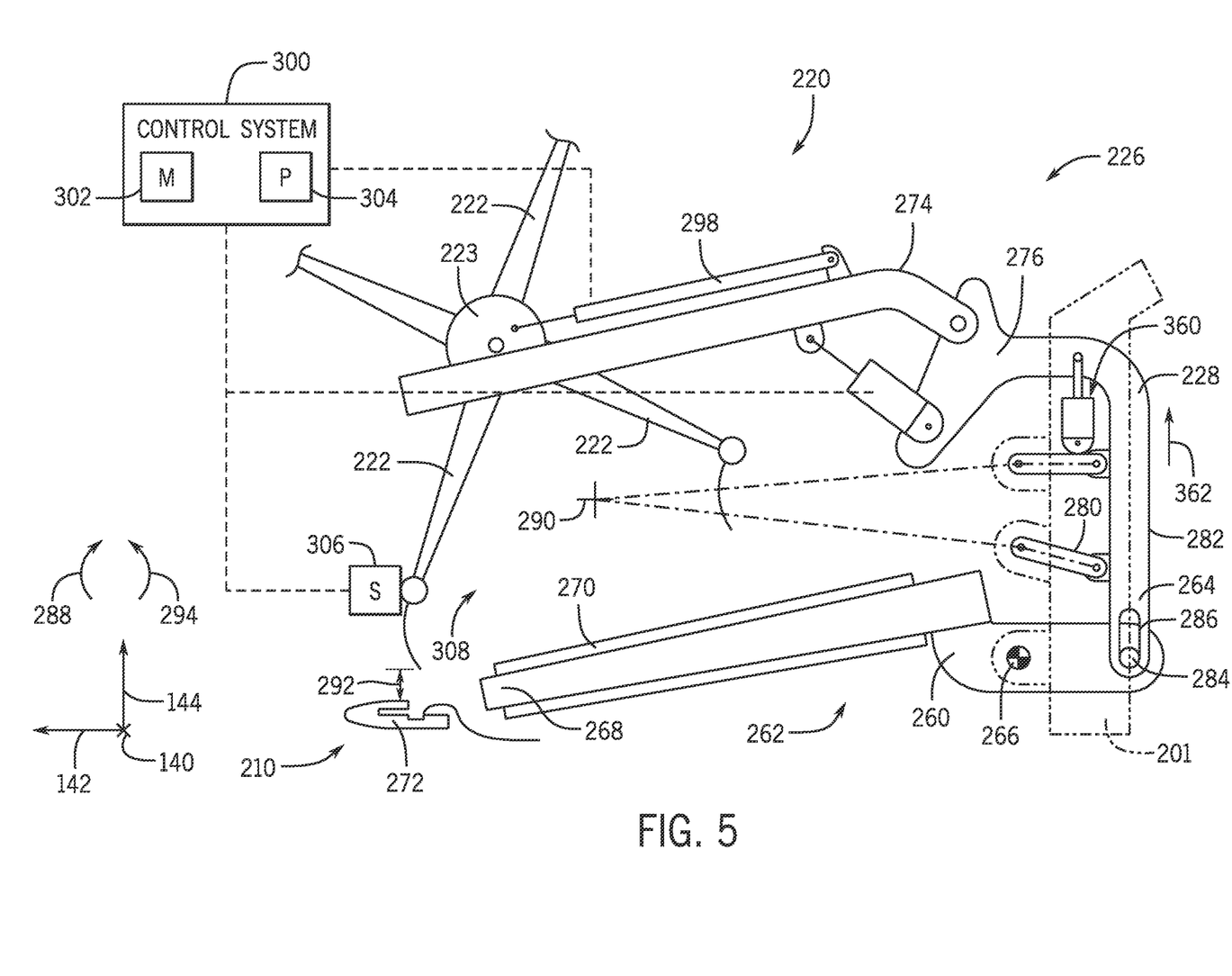
FIG. 5 is a side view of an embodiment of the linkage system of FIG. 3, in which the linkage system includes a biasing member, in accordance with an aspect of the present disclosure.

FIG. 5 is a side view of an embodiment of the linkage system 226 of FIG. 3. The linkage system 226 includes the bracket 228 configured to couple to the frame 201 via the links 279, 280. The illustrated linkage system 226 also includes a biasing member 360 configured to support a weight of the linkage system 226, such as a weight of the reel assembly and the bracket 228. The illustrated biasing member 360 is coupled adjacent to the second section 276 of the bracket 228, but additional or alternative biasing members may be coupled to any suitable section of the bracket, such as to the first section and/or to the third section. The biasing member 360 may include a spring, a hydraulic cylinder, a linear actuator, another suitable type of biasing member, or any combination thereof, configured to exert a force in a direction 362 along the frame 201 away from the arm assembly 262 in order to offset a gravitational force imparted onto the linkage system 226. As a result, the biasing member 360 may enable movement of the arm assembly 262 to impart a sufficient force to move the bracket 228 relative to the frame 201. That is, the biasing member 360 may reduce an effective weight of the bracket 228 and/or the reel assembly, thereby reducing a force applied by the arm assembly 262 to move the bracket 228. Indeed, the biasing member 360 may be selectable and/or controllable to exert a particular force to enable one of the arm assemblies to move the bracket 228 at a target force. For instance, reducing the force exerted by the biasing member 360 may increase the amount of force to be exerted by the arm assembly to drive movement of the bracket 228, and increasing the force exerted by the biasing member 360 may reduce the amount of force to be exerted by the arm assembly to drive movement the bracket 228.

In the illustrated embodiment, the links 279, 280 (e.g., respective longitudinal axes of the links 279, 280) are substantially parallel to one another. For this reason, rotation of the links 279, 280 may substantially cause translational movement (e.g., along the vertical axis 144) of the bracket 228 relative to the frame 201 in addition to or as an alternative to rotational movement of the bracket 228 relative to the frame 201. That is, due to the arrangement of the links 279, 280, the linkage system 226 may not have a pivot point (e.g., the pivot point 290 of FIG. 3), and the bracket 228 may not substantially rotate relative to the frame 201. The translational movement of the bracket 228 still enables movement of the arm assembly 262 to drive movement of the reel assembly and maintain the distance between the blade of the arm assembly 262 and the fingers of the reel assembly.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C.

The invention claimed is:

1. A header for an agricultural system, the header comprising:
    a frame;
    a bracket movably coupled to the frame;
    a reel assembly coupled to the bracket, wherein the reel assembly comprises a reel arm rotatably coupled to the bracket; and
    a cutter bar assembly rotatably coupled to the frame and coupled to the bracket such that movement of the cutter bar assembly relative to the frame is configured to drive corresponding movement of the bracket and the reel assembly relative to the frame, wherein the cutter bar assembly comprises an arm that is rotatably coupled to the frame at a pivot,
    wherein the arm is coupled to the frame and to the bracket such that movement of the arm relative to the frame is configured to drive corresponding movement of the bracket and the reel arm relative to the frame such that the bracket maintains a distance between a blade of the cutter bar assembly and a finger of the reel assembly above a first threshold distance and below a second threshold distance that is greater than the first threshold distance.

2. The header of claim 1, wherein the arm comprises an insert configured to extend through an opening of the bracket.

3. The header of claim 2, wherein the arm is configured to rotate about the pivot during operation of the agricultural system, and rotation of the arm about the pivot is configured to move the insert within the opening to drive the movement of the bracket and the reel assembly relative to the frame.

4. The header of claim 1, further comprising a link, wherein the bracket is rotatably coupled to the frame via the link, and rotation of the cutter bar assembly in a rotational direction is configured to drive rotation of the bracket and the reel assembly relative to the frame in the rotational direction.

5. The header of claim 1, wherein the header further comprises a first actuator configured to couple to the reel arm and to the bracket, the first actuator is configured to extend to rotate the reel arm in a first rotational direction relative to the bracket, and the first actuator is configured to retract to rotate the reel arm in a second rotational direction, opposite the first rotational direction, relative to the bracket.

6. The header of claim 5, wherein the reel assembly further comprises a second actuator configured to couple to the reel arm and to a central framework, and the second actuator is configured to translate the central framework along the reel arm.

7. The header of claim 6, further comprising a control system communicatively coupled to the first actuator, the second actuator, or both, wherein the control system is configured to cause the first actuator, the second actuator, or both, to adjust based on a user input.

8. A linkage system for a header of an agricultural system, the linkage system comprising:
    a bracket comprising a first section configured to couple to an arm of a cutter bar assembly of the header and a second section configured to couple to a reel arm of a reel assembly of the header;
    a set of links configured to couple the bracket to a frame of the header such that movement of the arm of the cutter bar assembly of the header relative to the frame of the header is configured to drive the bracket to move relative to the frame via the set of links; and
    an extension coupled to the bracket and an additional bracket coupled to the extension, wherein the bracket and the additional bracket are offset from one another along a lateral axis of the extension.

9. The linkage system of claim 8, wherein the first section is configured to couple to the arm via a key-slot interface.

10. The linkage system of claim 9, wherein the key-slot interface comprises a slot having an oblong shape.

11. The linkage system of claim 8, wherein the additional bracket is configured to couple to an additional arm of the cutter bar assembly of the header such that the movement of the arm relative to the frame, movement of the additional arm relative to the frame, or both, is configured to drive the bracket and the additional bracket to move relative to the frame via the set of links.

12. The linkage system of claim 8, wherein the set of links comprises a first link and a second link angled relative to one another such that the movement of the arm relative to the frame is configured to drive the bracket to rotate relative to the frame via the first link and the second link.

13. The linkage system of claim 8, wherein the set of links comprises a first link and a second link substantially parallel relative to one another such that the movement of the arm is configured to drive the bracket to translate relative to the frame via the first link and the second link.

14. The linkage system of claim 8, further comprising a biasing member configured to couple the bracket to the frame, wherein the biasing member is configured to impart a force on the bracket in a direction away from the arm to support a weight of the bracket and the reel arm.

15. A header for an agricultural system, the header comprising:
    a frame;
    a bracket movably coupled to the frame;
    a reel assembly comprising a reel arm coupled to the bracket, a central framework coupled to the reel arm, and a finger extending from the central framework; and
    a cutter bar assembly comprising an arm and a blade coupled to the arm, wherein the arm is coupled to the frame and to the bracket such that movement of the arm relative to the frame is configured to drive corresponding movement of the bracket and the reel arm relative to the frame such that the bracket maintains a distance between the blade of the cutter bar assembly and the finger of the reel assembly above a first threshold distance and below a second threshold distance that is greater than the first threshold distance.

16. The header of claim 15, further comprising a first section and a second section, wherein the bracket is movably coupled to the frame at the first section, the header further comprises an additional bracket movably coupled to the frame at the second section, the reel assembly further comprises an additional reel arm coupled to the additional bracket, and the cutter bar assembly further comprises an additional arm coupled to the additional bracket such that movement of the additional arm relative to the frame is configured to drive corresponding movement of the additional bracket and the additional reel arm relative to the frame.

17. The header of claim 15, wherein the reel arm is configured to rotate relative to the bracket, the central framework is configured to translate along the reel arm, and the first threshold distance, the second threshold distance, or both, are based on a position of the reel arm relative to the bracket, a position of the central framework relative to the reel arm, or both.

18. The header of claim 15, wherein the bracket is positioned at a lateral edge portion of the header.

* * * * *